2,725,256
FARM SPRAYER

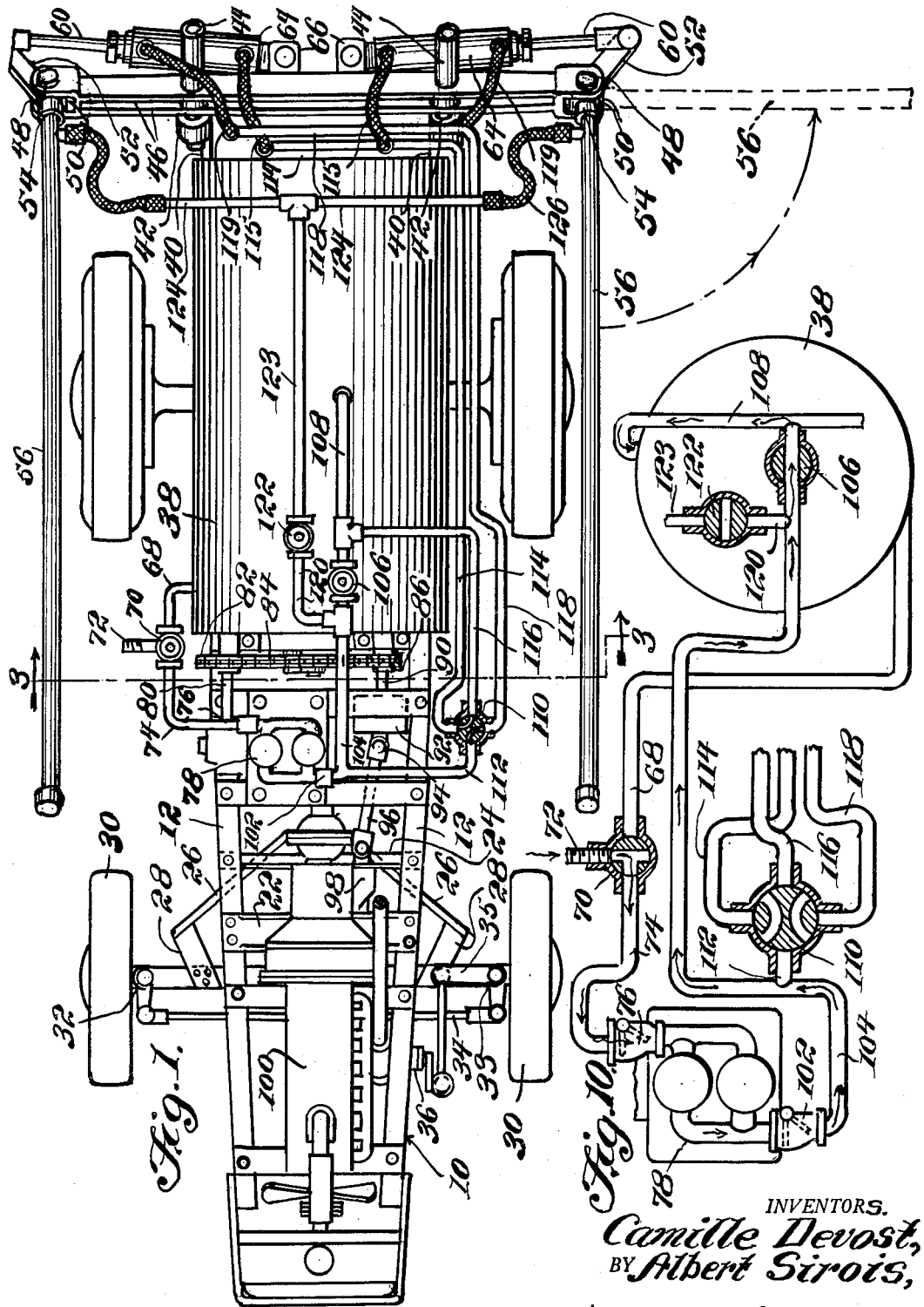

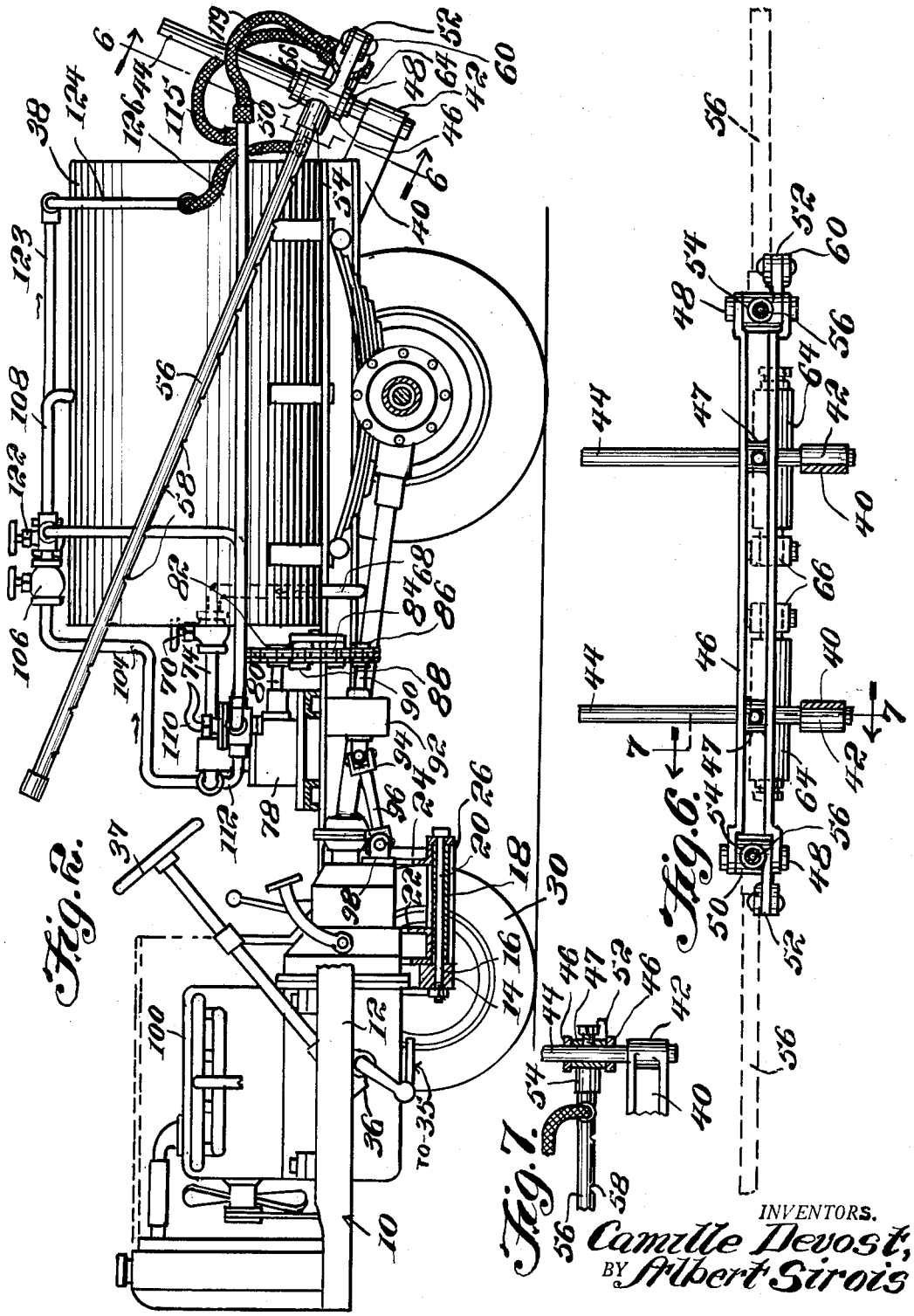

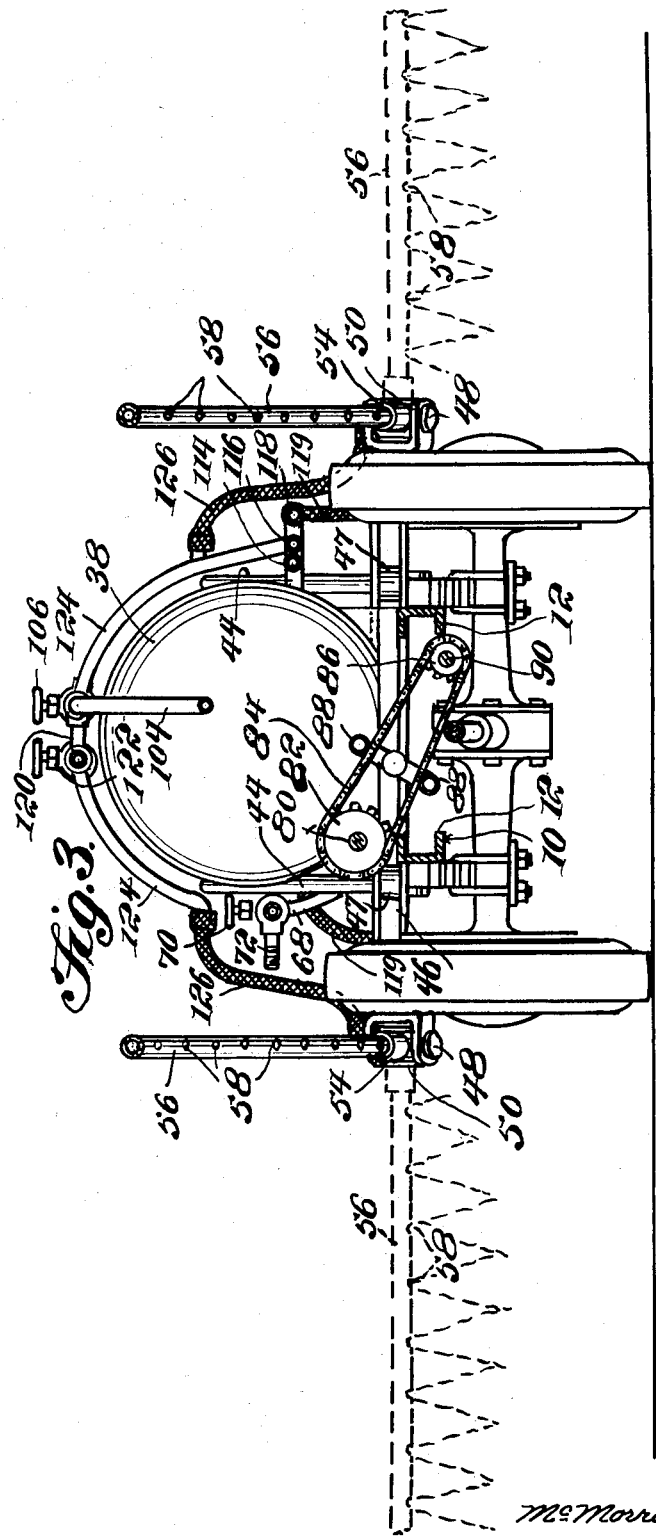
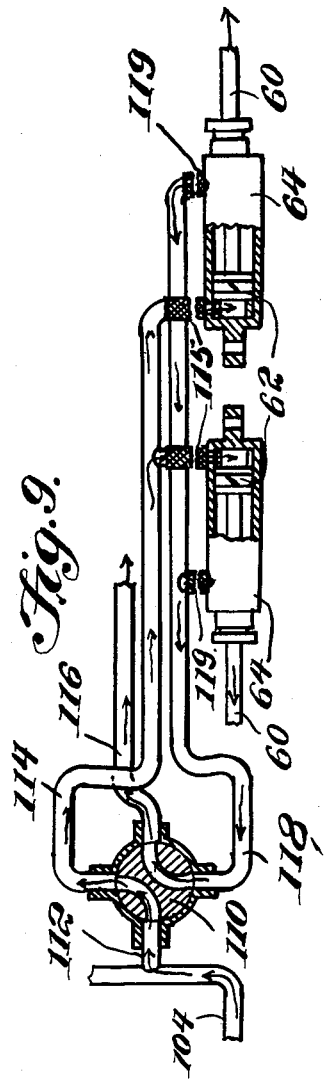

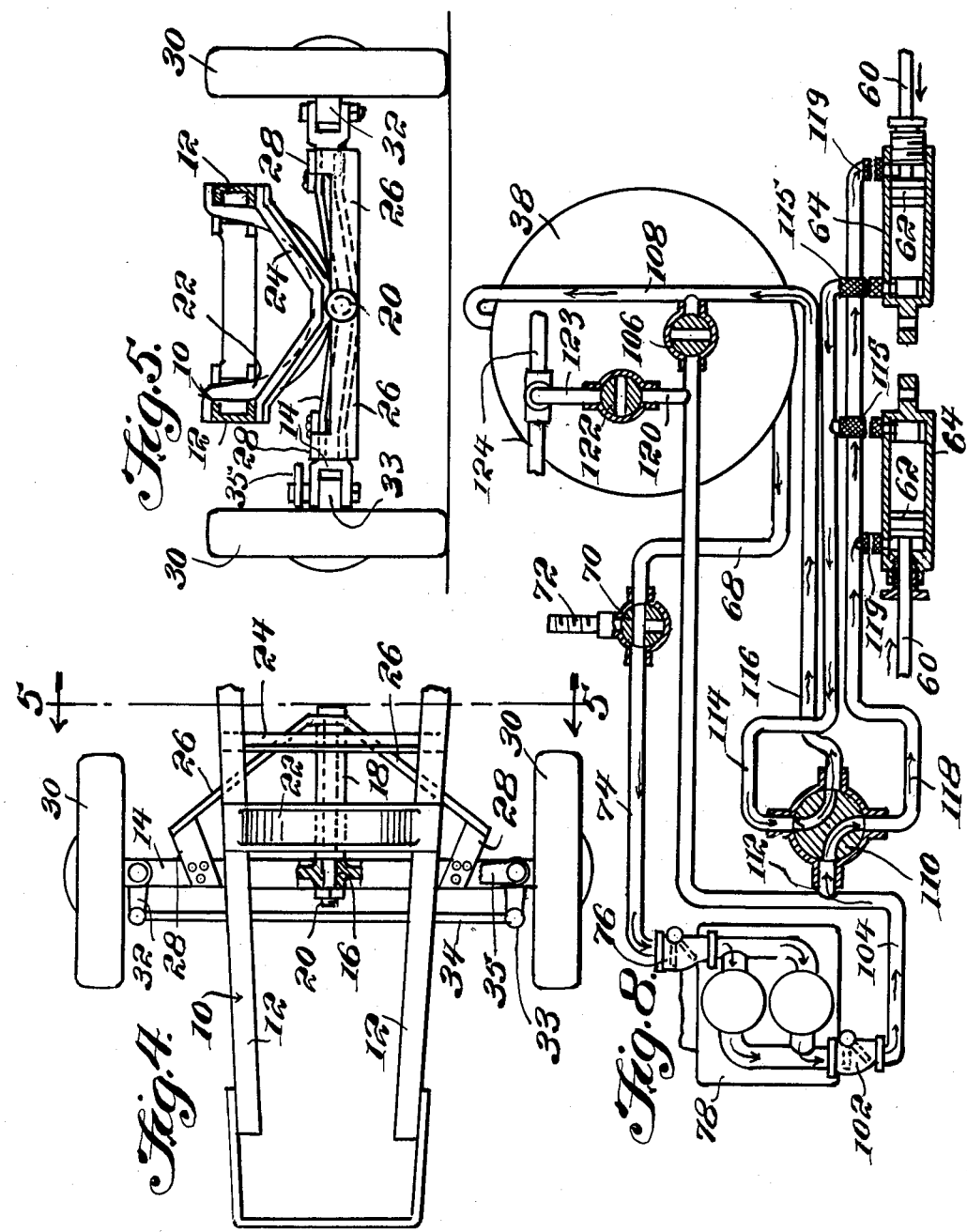

Camille Devost and Albert Sirois, Grand Isle, Maine

Application January 18, 1955, Serial No. 482,623

5 Claims. (Cl. 299—41)

This invention relates to a vehicle mounted sprayer, and more particularly has reference to a boom type sprayer to which liquid is supplied from a large tank, the tank and the spraying structure being mounted upon a self propelled vehicle and being especially adapted for large scale spraying of insecticides, liquid fertilizers, and other crop treating or conditioning liquids.

In accordance with the present invention, a specially designed truck chassis is utilized, on which the spraying structure is mounted, as distinguished from more conventional sprayers which are mounted upon tractors or are drawn behind the tractors, at slow speed. In accordance with the invention, booms are swingably mounted at opposite sides of the supply tank, and are moved inwardly as well as outwardly, between folded positions along the opposite sides of the tank and extended positions in which they project laterally forwardly from the vehicle in opposite directions, entirely by hydraulic pressure. The hydraulic pressure used for swinging the booms is derived entirely from the pumping of the fluid which is contained in the tank. In other words, instead of a separate hydraulic system, the booms are moved inwardly and outwardly by the very fluid which is sprayed. Heretofore, the conventional sprayer structure has involved manually swingable booms, and this obviously is undesirable in view of the difficulty and time required in swinging the booms inwardly and outwardly between their collapsed and extended positions.

The invention, further summarized briefly, includes a system of fluid flow lines and control valves, through which the fluid is caused to flow under pressure by operation of a pump connected to a specially designed power takeoff of the vehicle engine. Still further, the front wheels of the vehicle are mounted to rock about an axis extending longitudinally and centrally of the vehicle chassis, to permit the front wheels to conform to changing topography of the ground. The front wheels are further designed to permit turning in a particularly short radius, thus to make the vehicle highly maneuverable and especially adapted for use on rough and uneven ground, on hills, etc.

Among important objects of the invention are to provide a highly maneuverable sprayer; to adapt the sprayer for use in various types of farming operations including the spraying of orchards and the like; to permit the sprayer to cover a substantially greater amount of ground than other sprayers of the same general size and capacity now in use, over an equal period of time; to permit movement of the booms between their inner and outer positions responsive to no more than the turning of conveniently located valves; and to accomplish the stated purposes of the invention while not increasing the cost of manufacture above that required for construction of other sprayers in general use today.

Other objects will appear from the following description, the claims appended thereto, and from the annexed drawing, in which like reference characters designate like parts throughout the several views, and wherein:

Figure 1 is a top plan view of a vehicle mounted sprayer according to the invention;

Figure 2 is a side elevational view in which parts are shown in longitudinal section;

Figure 3 is a transverse sectional view on line 3—3 of Figure 1;

Figure 4 is a top plan view of the front end of the vehicle with the motor removed;

Figure 5 is a transverse sectional view on line 5—5 of Figure 4;

Figure 6 is a transverse sectional view on line 6—6 of Figure 2;

Figure 7 is a detail sectional view on line 7—7 of Figure 6;

Figure 8 is a generally diagrammatic view of the fluid flow system with the valves in position for swinging the booms to their outer, use positions;

Figure 9 is a diagrammatic view showing part of the fluid flow system, with the valves arranged for swinging the booms inwardly; and Figure 10 is a diagrammatic view of the fluid flow system with the valves arranged for filling the tank with liquid to be sprayed.

At 10 there has been generally designated a vehicle frame. An important characteristic of the invention, in this regard, resides in the fact that the entire spraying device is mounted upon a truck chassis, so that whenever the vehicle is not being used for actual spraying operations, but rather, is being driven to and from a supply of water, for example, it can move at relatively high speed, thus to reduce measurably the overall time required for preparing the vehicle for spraying.

The vehicle frame 10 includes longitudinal frame members 12, between which, adjacent the front end of the vehicle, there extends a front axle 14.

The front axle 14 is formed, medially between its ends, with a bearing opening 16 extending diametrically thereof in a fore and aft direction relative to the vehicle. An elongated sleeve 18, as shown in Figures 2 and 4, is arranged longitudinally and centrally of the vehicle, in coaxial alignment with the bearing opening 16, rearwardly of the axle 14. Sleeve 18 receives a shaft 20, which projects through the bearing opening 16, and at its front end, the sleeve is welded or otherwise fixedly secured to the midlength portion of a transversely disposed, downwardly bowed (Figures 4 and 5) front, sleeve supporting cross member 22 fixedly secured at its opposite ends to the respective longitudinal frame members 12. A substantially V-shaped rear sleeve supporting cross member 24 is fixedly secured intermediate its ends to the rear end of sleeve 18, and at its opposite ends to the longitudinal frame members 12.

By reason of this arrangement, the front axle is rockably supported for pivotal movement about an axis extending horizontally, longitudinally and centrally of the vehicle frame, thus to permit the front wheels of the vehicle to ride over obstructions and to accommodate themselves to uneven ground contours.

A bracing structure is provided for the vehicle axle, and rocks therewith about said axis. This comprises an elongated bar 26 bent substantially into a V-shape and lying in a substantially horizontal plane, the bar 26 being formed medially between its ends with an opening receiving the sleeve 18. At its opposite ends, the bracing bar 26 is welded to rearwardly divergent axle brace brackets 28 riveted to opposite ends of the axle 14.

Front wheels 30 are steerable by means of steering arms 32, 33 connected by a tie rod 34. Arm 33 is formed as a bell crank, having an inwardly, laterally extended leg 35 pivotally connected to a conventional steering mechanism 36 operable by rotation of a steering wheel 37 in a selected direction.

The steering mechanism is so designed that the front wheels can be steered regardless of the angle of inclination above the axle 14. This can be provided by the use of sliding pivotal connections or lost motion connections between the steering mechanism 36 and the bell crank 32, 35 and/or the use of a longitudinally extensible link between the leg 35 and the steering mechanism 36, which link can be formed of spline sections, if desired.

Mounted upon the rear portion of the vehicle, above the rear wheels, is a liquid supply tank 38.

To the rear ends of the longitudinal frame members 12 there are welded downwardly and rearwardly extended boom support brackets 40 terminating at their rear, lower ends in open ended post support sleeves 42 inclined from the vertical. Posts 44 are fixedly mounted in sleeves 42 and extend upwardly a substantial distance therefrom (Figures 1 and 2).

The posts 44 extend through openings formed in a pair of boom supporting cross bars 46 the opposite ends of which project laterally beyond opposite sides of the vehicle frame as shown in Figure 1. The cross bars 46 lie in inclined plane perpendicular to the length of the respective posts 44. Set collars 47, rigid with and disposed between the bars, receive the posts and are fixedly connectable thereto in selected positions to which the bars are adjusted along the post. Extending between the ends of the respective cross bars are hinge pins 48 parallel to the posts and passing through sleeves 50 (Figures 1 and 6) integral with arms 52 extending radially of the hinge pins.

Also extending radially of the hinge pins, and disposed at obtuse angles to the arms 52, are tubular sockets 54, in which are threaded or otherwise detachably but fixedly secured the inner ends of elongated, tubular, straight booms 56 each of which has a longitudinal series of spray openings 58, the booms being closed at their outer ends. Due to this arrangement, the booms 56 could be removed for substitution of other booms having different sizes or arrangements of spray openings, and in this way, the sprayer could be made highly versatile, so as to be either a high or low pressure sprayer, whichever is desired.

In any event, as shown in Figure 1, pivotally connected to the outer ends of the arms 52 are piston rods 60 the inner ends of which (Figure 8) are secured to pistons 62 reciprocating in cylinders 64 pivotally connected at their inner ends (Figure 1) to cylinder support brackets 66. When the piston rods are extended outwardly as in Figures 1 and 8, the booms 56 will be caused to swing about the axis of the hinge pins 48 to their inoperative, folded positions in which the booms extend in parallelism with the tank, along opposite sides of the vehicle. If, however, the pistons 62 are forced toward the inner ends of the cylinders as in Figure 9, the booms will be swung outwardly to their dotted line positions of Figures 3 and 6, so as to project outwardly from the vehicle to a substantial extent, for spraying operations. The booms, due to the inclined positions of the hinge pins, swing in inclined planes between their inoperative and operative positions, the booms being inclined from the horizontal to a substantial extent as shown in Figure 2 when inoperatively disposed, and being extended in horizontal positions when operatively disposed as shown in Figure 3 in dotted outline.

Considering now the fluid flow system of the sprayer, reference should be had to Figures 1–3, and in particular to Figures 8–10. As shown in Figure 8, extending from tank 38, at the bottom of the tank, is a main tank outflow line 68, extending to a manually operable valve 70 having a removable filler plug 72. The valve is of the two way type, and is rotatable between its Figure 8 and Figure 10 positions respectively. The valve is connected to a pump intake line 74 extending to a check valve 76 at the input side of a pump 78. The pump 78 (Figures 2 and 3) is driven by a shaft 80 rotated by a driven sprocket 82 about which is trained a chain 84 also extending about a drive sprocket 86. Chain tighteners 88 are provided to hold the chain under proper tension, and the driven sprocket 86 is rotated by a drive shaft 90 extending from a pump transmission or gear box 92. Extending into the transmission 92 is a shaft connected by a universal 94 to a power takeoff shaft 96 universally connected to a power takeoff 98 of the vehicle engine 100.

At the output side of pump 78 (Figure 8) there is provided a check valve 102 connected to a pump outlet line 104 extending to a manually operable valve 106 connected in communication with a tank fill pipe 108.

Intermediate its ends, the pump outlet line 104 is in communication with a line 112 extending to a distributor valve 110.

Reference may now be had to the position of the parts of the fluid flow system when the tank is being initially filled with a supply of liquid. To fill the tank, one first removes plug 72 with valve 70 in the position shown in Figure 10, and connects to the valve 70 a filler hose, not shown, extending from a suitable source of liquid, such as a pond, irrigation canal, or the like. The valve 70 when in this position closes off the tank outflow line 68 from the pump intake line 74 and connects the intake line 74 in communication with the force of liquid.

Valve 110 is positioned as shown in Figure 10, fully closed, to prevent the flow of liquid through line 112 to valve 110 and beyond. The pump is now operated, and the liquid will be pumped through valve 70 and line 74, through the pump 78, the liquid passing through line 104 in the direction of the arrow shown in Figure 10. The valve 106 is positioned as shown in Figure 10, to communicate lines 104, 108. A valve 122, to be described hereinafter, is in closed position. Thus, the liquid is pumped into the tank, until the tank has been filled to a selected extent.

The valve 110 is a fourway valve, and is connected not only to line 112, but also to lines 114, 116, 118. The line 116 is a return line to the tank, extending into communication with line 108. The line 114 is connected to flexible hoses 115, extending to the inner ends of cylinders 64; while the line 118 is connected at its discharge end to flexible hoses 119 extending to the outer ends of cylinders 64, as shown in Figures 1 and 8. When liquid is being forced under pressure through the line 118 to the cylinders 64 as shown by the arrows in Figure 8, the pistons 62 will be moved from their Figure 8 to their Figure 9 positions, thus causing the booms to move outwardly to their extended or operative positions. The line 118 can thus be appropriately termed the boom extension pressure line. The line 114, during the movement of the booms to their extended positions, provides a return for fluid forced out of the cylinders by the pistons while the pistons are moving from their Figure 8 to their Figure 9 positions. This is also shown by the arrows in Figure 8, and as will be noted, the valve 110 under these circumstances is rotated so as to connect lines 112 and 118 in communication, and lines 114, 116 in communication with each other. Thus, the fluid is pumped under pressure into line 118, to extend the booms, and the liquid forced out of the cylinders during this stage of the operation passes into the line 114, returning to the valve 110 and passing through the valve into the return line 116, back to the tank.

When it is desired to swing the booms inwardly to their folded positions, the parts are positioned as shown in Figure 9. The valve 110 is rotated through 90° to connect lines 112, 114 in communication with each other and lines 116, 118 in communication with each other. Now, fluid pumped under pressure through line 104 from the pump passes into the boom retraction pressure line 114, passing in the direction of the arrows through the hoses 115 into the cylinders 64. The pistons 62 will be forced, now, from their Figure 9 to their Figure 8 positions, with the fluid moving out of the cylinders through lines 119, 118, 116, 108 to the tank.

Connected in communication with line 104, between the pump and the check valve 106, is a boom feed line 120, extending to a manually operable valve 122. Connected to the other side of valve 122 is an extension 123 of the feed line, connected in communication with branches 124. The branches 124, as shown in Figure 3, are arcuately curved, extending downwardly along opposite sides of the tank. At their outlet ends, the branches 124 are connected to flexible branch extensions 126, which at their outlet ends are connected to the inner ends of booms 56, so as to supply fluid under pressure to the booms to be ejected in jet form from the spray openings 58. As shown in Figure 8, when the booms are being swung outwardly, the valve 122 may be closed so that all pressure is directed to the cylinders 64. However, this not absolutely essential, and with the pressure sufficiently high, the valve 122 might be left open, so that as the booms swing to their outer positions, liquid may begin to spray from the openings 58. This prevents an unnecessary strain from being placed upon the pump should the pump be placed in operation while the valve 122 is closed, for a length of time greater than that required to shift the pistons 62 to their Figure 9 from their Figure 8 positions. It is only necessary, to swing the booms outwardly, to shift them to a slight extent from their positions shown in full lines in Figure 3. As soon as they move outwardly to a slight extent, due to their swinging in inclined planes they tend to gravitate toward their operative, dotted line positions shown in Figure 3, to supplement the fluid pressure applied within the cylinders tending to move the booms to their extended positions.

Of course, when the booms are being swung inwardly to their folded positions, the same is true, and it may be desired to leave the valve 122 open until the booms are in their fully collapsed or folded positions and the pump can be halted.

It is, in fact, possible to swing the booms between their open and closed positions while the vehicle is moving over the ground, spraying. For example, it may be desired to swing the booms inwardly for a few moments, to clear an obstacle, such as a large tree in the path of the vehicle. One need only, under these circumstances, shift valve 110 from its normal, neutral position shown in Figure 10 to its Figure 9 position, while a liquid is still being sprayed from the booms. The booms will swing inwardly to clear the obstacle, after which the valve 110 is swung to its Figure 8 position to swing the booms outwardly. Thereafter, the valve 110 is turned immedaitely to its neutral, Figure 10, position as the spraying operation continues.

It will be seen that the spraying device has a considerable amount of versatility, and is adapted for extension or retraction of the booms with a minimum of effort so far as the worker is concerned. It is not necessary to halt the vehicle while the booms are swung manually inwardly or outwardly, and the vehicle operator, without further assistance, can drive the vehicle, operate the booms between their extended and retracted positions, and otherwise control the entire spraying operation without difficulty. Further, due to the fact that the entire device is mounted upon a truck chassis, whenever spraying operations are halted as, for example, when the vehicle is being driven between separate fields, the vehicle can be driven at any desired speed to reduce the overall amount of time required during the spraying activities. Still further, the construction permits the tank to be driven to and from a source of liquid supply, in a minimum amount of time.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A sprayer comprising a wheeled frame; a tank thereon; a pair of perforated booms pivoted on the frame to swing between extended and retracted positions respectively; and a liquid flow system including means for forcing liquid under pressure from the tank, hydraulic cylinder and piston assemblies connected to the booms for swinging the same between their retracted and extended positions, lines extending from the tank to said booms and assemblies, a filler plug in one of said lines, and valve means for controlling the flow of liquid to said assemblies and booms respectively, said valve means being adapted for neutral disposition with the filler plug open, so as to permit filling of the tank responsive to operation of the first named means with the filler plug connected to a source of liquid.

2. A sprayer comprising a wheeled frame; a tank thereon; a pair of perforated booms pivoted on the frame to swing between extended and retracted positions respectively; and a liquid flow system including a pump, a main outflow line connected between the tank and pump, hydraulic cylinder and piston assemblies connected with the booms for swinging the booms between their retracted and extended positions, an output line extending from the pump, boom feed lines connected to the output line and booms, lines extending from the output line to said assemblies, and valve means for controlling the flow of liquid through the boom feed lines and last named lines respectively.

3. A sprayer comprising a wheel frame; a tank thereon; a pair of perforated booms pivotally connected at one end to the frame to swing between extended and retracted positions respectively, the booms in their extended positions projecting outwardly in opposite directions from the frame and in their retracted positions extending longitudinally of the frame at opposite sides thereof; and a liquid flow system including a pump, a main outflow line connected between the tank and pump, hydraulic cylinder and piston assemblies connected with the booms for swinging the booms between their retracted and extended positions, an output line extending from the pump, boom feed lines connected to the output line and booms, lines extending from the output line to said assemblies, and valve means for controlling the flow of liquid through the boom feed lines and last named lines respectively.

4. A sprayer comprising a wheel frame; a tank thereon; a pair of parallel posts fixedly secured to and extending upwardly from the frame in positions inclined from the vertical; a pair of parallel cross bars carried by said posts, said cross bars having openings receiving the posts, for adjusting the cross bars upwardly and downwardly along the length of the posts; means connecting the cross bars adapted to be fixed to the post in selected positions to which the cross bars are adjusted; a pair of perforated booms pivotally connected at one end to the opposite ends of the cross bars between the cross bars, for swinging movement between extended and retracted position in each position to which the cross bars are adjusted along the posts, said booms in their extended positions projecting laterally, outwardly of the frame in opposite directions and in their retracted positions extending longitudinally of the frames in parallel relation thereto; and a liquid flow system including a pump, a main outflow line connected between the tank and pump, hydraulic cylinder and piston assemblies connected with the booms for swinging the booms between their retracted and extended positions, an output line extending from the pump, boom feed lines connected to the output line and booms, lines extending from the output line to said assemblies, and valve means for controlling the flow of liquid through the boom feed lines and last named lines respectively.

5. A sprayer comprising a wheeled frame; a tank thereon; a pair of perforated booms pivotally connected at one end to the frame to swing between extended and retracted positions respectively, said booms pivoting about axes inclined from the vertical, so as to swing in inclined planes, the booms in their extended positions projecting horizontally, outwardly in opposite directions from the frames, and in their retracted positions being extended along opposite sides of the frame and declining in the direction of said one end of the booms; and a liquid flow system including a pump, a main outflow line connected between the tank and pump, hydraulic cylinder and piston assemblies connected with the booms for swinging the booms between their retracted and extended positions, an output line extending from the pump, boom feed lines connected to the output line and booms, lines extending from the output line to said assemblies, and valve means for controlling the flow of liquid through the boom feed lines and last named lines respectively.

References Cited in the file of this patent

UNITED STATES PATENTS

| | | |
|---|---|---|
| 510,287 | Peppler | Dec. 5, 1893 |
| 2,076,780 | Haupt | Apr. 13, 1937 |
| 2,305,913 | Troyer | Dec. 22, 1942 |
| 2,590,400 | Gollnick | Mar. 25, 1952 |

FOREIGN PATENTS

| | | |
|---|---|---|
| 572,556 | Great Britain | Oct. 12, 1945 |